June 13, 1933.  G. E. OTIS  1,913,681
METHOD OF HEATING AND VENTILATING
Filed July 11, 1931   5 Sheets-Sheet 1

Fig. 1.

June 13, 1933. G. E. OTIS 1,913,681
METHOD OF HEATING AND VENTILATING
Filed July 11, 1931 5 Sheets-Sheet 4

Patented June 13, 1933

1,913,681

UNITED STATES PATENT OFFICE

GERALD E. OTIS, OF MOLINE, ILLINOIS, ASSIGNOR TO THE HERMAN NELSON CORPORATION, OF MOLINE, ILLINOIS, A CORPORATION OF ILLINOIS

METHOD OF HEATING AND VENTILATING

Application filed July 11, 1931. Serial No. 550,071.

This invention relates to a method of heating and ventilating.

The present invention has reference to an improved method of heating and ventilating rooms in buildings whereby it is possible to maintain an agreeable and wholesome atmosphere under varying weather conditions and the effects of occupancy.

The popular idea that the air in occupied buildings it vitiated or polluted through respiration by human occupants is discredited by modern medical and scientific research. While it is true that air breathed over and over eventually loses its life-sustaining qualities, the fact is of little importance in the practical every day problem of ventilated buildings. Such chemical changes in air as ordinarily attend the most congested occupancy of modern buildings are insignificant. With the materials and methods of construction commonly employed, buildings are far from air-tight, and extensive investigations show that the change of air due to filtration and leakage is greatly in excess of what is required to maintain a proper chemical condition of the air. Moreover, hygienists now attach little or no importance to the possibility of organic pollution by respiration. If air-bourne diseases and toxic organic matter are not regarded purely as bugaboos, at least frequent air renewal is not looked upon in authoritative circles as a proper corrective measure.

Scientific data accruing during the past twenty-five years indicate that it is principally the physical characteristics of the atmosphere which govern its effect on human comfort and health. Of course, air motion and temperature are of first importance. Humidity is a third item, but within certain limits of minor importance. Odors, being largely or entrely due to overheating in the class of work to which this invention is directed, are an incidental rather than an essential factor, and are corrected by proper air motion and temperature control. Cleanness of the air is an element for consideration. While ordinary dust and the forms of bacteria commonly associated with it are not essentially harmful, it is generally felt that they may be if present in sufficient amounts.

Humidity is chiefly important as its affects the sensible or effective temperature of air, it being well known that with a given temperature of air, the same will feel warmer if the humidity is higher, or cooler if the humidity is lower. I employ this principle in certain phases of this invention to lower the effective temperature of the room by reducing the moisture content, and of raising the effective temperature by increasing the moisture content.

The specific object of this invention is to provide a method of heating and ventilating whereby an approximately uniform degree of temperature and air motion can be maintained in isolated spaces under varying weather conditions and the effects of occupancy, and wherein additional remedial measures, such as humidification, filtration and ozonation, may be incorporated if required.

In order to maintain an approximately uniform temperature in an isolated space under varying weather condtions and the effects of occupancy, I employ controllable artificial heating and cooling means and a method of regulating the same, so that they will serve as required to counterbalance the resultant effect of occupancy and the weather. The occupants themselves, sunshine, lighting and power devices act as independent heating agencies, whereas the outdoor temperature may have either a heating or cooling effect, depending upon the weather.

Whenever the combined effects of the various independent heating and cooling agencies are such that the temperature of the room concerned tends to drop below that desired, the artificial heating means are employed to maintain equilibrium, and when the net result of the various independent effects tends to raise the room temperature above the desired point, the artificial cooling means are brought into play.

Steam or hot water radiators are commonly employed for artificial heating and are used to illustrate the application of this invention, but other means may be employed, as will be understood by those versed in the art. Under the climatic conditions prevailing over the greater part of the United States and in many other countries, outdoor air may be satisfactorily used for cooling and is the principal medium employed in this invention. In schools and other crowded spaces to which my invention is particularly adaptable, the independent heating effects of occupancy usually tend to create an indoor temperature considerably higher than the outdoor temperature, and artificial cooling may be effected by introducing and diffusing outdoor air in the space concerned. As will be readily appreciated by those skilled in the art, the outdoor air introduced may be pre-cooled, washed or otherwise treated, if desired, before entering the distributing apparatus illustrated, without affecting the method of this invention.

As heretofore explained, the quantity of outdoor air required for breathing purposes only is very small, and is usually provided in ample amounts by natural filtration and leakage through the building. Therefore, my method provides little or no artificial supply of outdoor air in cold weather. As the weather moderates, however, additional amounts are introduced for cooling, and unless the supply is pre-cooled, the quantity is increased at an accelerated rate as the outdoor temperature rises, because the cooling duty increases and the cooling capacity of the outdoor air decreases.

Heretofore, it has been common practice to supply in all weather, no matter how cold, the amount of outdoor air required in mild weather, and to modify its cooling effect as required by preheating. Obviously, this practice is very wasteful. On the other hand, if the amount of air circulated in the space to be ventilated is varied as the weather changes, the degree of air motion will vary. This, of itself, is undesirable, and experience has shown that air of a temperature much lower than that of the room into which it is introduced, even in small amounts, will not readily intermix with the room air, and consequently will cause drafts.

In order to maintain an approximately uniform temperature in the space served, and at the same time vary the amounts of outdoor air introduced as required for cooling purposes, I compensate for reductions in the outdoor air supply by the admixture or substitution of recirculated indoor air. In the nature of the problem to be met, the full supply of outdoor air for cooling will only be used when the weather is mild, and the temperature of the same will be high enough so that the outdoor air will readily intermix with the air in the room. When the outdoor air is colder, the amount required will be less and will be tempered through admixture with recirculated indoor air so as to insure ready diffusion in the room, and thus drafts are avoided at all times.

In order to more fully explain my invention, I refer to the accompanying drawings, wherein,—

Referring first to Figures 1 to 5 inclusive, each of these figures represents a room in a building equipped with a unit ventilator 1, an ordinary steam radiator 2, and a thermostat 3. The apparatus and equipment shown are to be construed merely as illustrative of the nature of the steps involved in the method of the present invention, and are regarded solely from a functionary standpoint.

The essentials included in the apparatus are controllable means for heating the room; means for maintaining an approximately uniform rate of air circulation in the room; controllable means associated with the circulatory means whereby the air subjected to circulation may be confined either entirely to the air within the room itself, or to air admitted from outdoors, or to air introduced from both sources, and to the means for correlating the heating means and the air controlling means in conformity with the principles of the present invention, and in such a way that on a rise of temperature, the heating means will be either cut off before or progressively restricted as the outdoor air is admitted to circulation.

The unit ventilator 1, as illustrated, consists of a sheet metal cabinet having an air intake 4 for indoor air, an air intake 5 for outdoor air, and an air discharge outlet 6 directed into the room. An opening through the wall of the room in back of the cabinet and provided with a weatherproof louvre and screen serves the outdoor air intake 5.

When it is desired to locate the air circulating device exteriorly of the room, it will be necessary to provide duct extensions to and from the room and to arrange to conduct outdoor air to the outdoor air intake 5.

The unit ventilator 1, illustrated, is subdivided into a fan compartment 7, a suction compartment 8, and a recirculation passage 9. Outdoor air is delivered directly to the suction compartment through the outdoor air intake 5, and the amount of air is regulated by the damper 10. Indoor air is delivered into the suction compartment through the indoor air intake 4 and recirculating passage 9, and the amount is regulated by the damper 11. An electric fan 12, located in the fan compartment 7, draws air from indoors or outdoors, or both, according to the damper setting, through the suction compartment 8, and delivers it into the room through the air discharge outlet 6. A filter 13 is located in the fan compartment 7, so as to clean all the air delivered by the fan 12.

The unit ventilator 1, illustrated, is equipped with a steam radiator 14 positioned in the recirculation passage 9, so that the air recirculated from the room passes through it. However, this radiator may be omitted if the radiator 2 is correspondingly increased, or other room heating means are provided. A steam jet humidifier 15 is also shown in the recirculation passage 9, but neither the type nor location of the same is important as related to this invention.

The steam radiator 2 is representative of any means of heating the room. There are two reasons for illustrating both the radiator 2 and the radiator 14. First, it is a common case, because it is usually impractical to provide sufficient radiation within commercial types of unit ventilators to fully heat the rooms which they will serve in an air circulation capacity. Secondly, it is desirable to have the room heating means divided into two or more units in order to get two or more heat control steps for smoother regulation.

The thermostat 3 is representative of any regulating means that will provide correlation of the various control steps after the manner herein set forth. The various controls may be mechanically correlated for manual operation, if desired, as illustrated in my United States Letters Patent, No. 1,753,156 and No. 1,753,157.

The five drawings represent five intervals or steps in the cycle of operations by which the room temperature is controlled under the method of this invention. A pronounced advantage of this invention resides in reducing the waste common to previous methods by reason of the simultaneous operation of adverse functions. This is accomplished by continuously reducing one function as or before the adverse function is brought into play, or increased. Obviously, the maximum saving is effected when one function is completely restricted before the other is brought into play, or, in other words, if all artificial heating elements are completely throttled whenever outdoor air is admitted. Under certain conditions, however, more or less overlapping or shading of the two functions is desirable in practice, and under such circumstances, my method still effects considerable saving by virtue of the fact that one function is continuously reduced as the other is increased.

Figure 1:
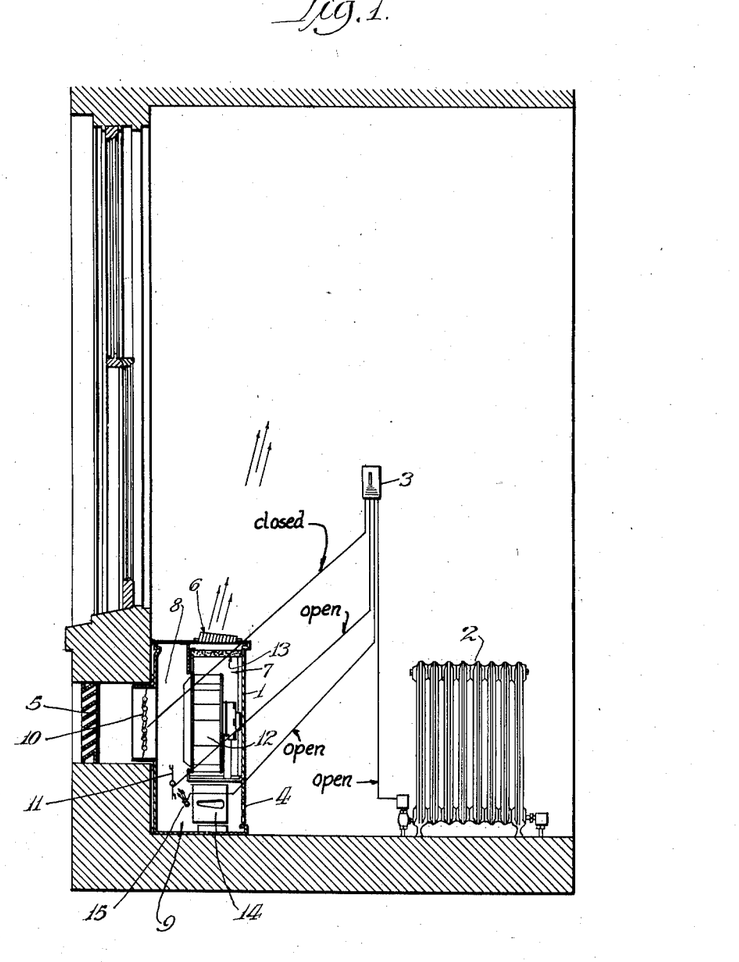
Figures 1 to 5 are each diagrammatic representations of the interior of a room having located therein some type of heating and ventilating appliance representing progressive variations of adjustment to carry out the steps or operations included in the present method.

In Figure 1, all artificial heating means, consisting in this instance of the radiators 2 and 14, are "open" or in operation, whereas the damper 10, which controls the admission of outdoor air for cooling, is closed, and the damper 11 is open to permit of the complete recirculation of room air. This represents a condition of maximum heating and minimum cooling, for the purpose of bringing the room up to temperature, and shows how the rate of air motion in the room is maintained by recirculation when little or no outdoor air is circulated. In some cases, such as where climatic conditions may cause the system to remain closed against the introduction of outdoor air for long periods and the building construction is unusually tight, it may be desirable to arrange a stop on the damper 10, or equivalent means to prevent complete restriction of the outdoor air supply. This will result in a certain amount of adverse functioning in this stage, but less than where the full amount of outdoor air is admitted.

Figure 2:
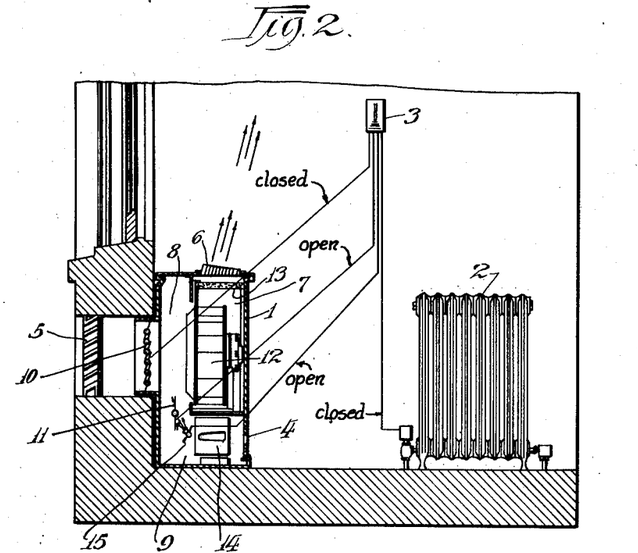

Fig. 2 represents the first step in correcting overheating, or the next to the last step in correcting a falling room temperature. The only change from the conditions shown in Fig. 1 is partial restriction of the artificial heating means, due in this instance to the radiator 2 being throttled. This may be done quickly or gradually, depending upon the temperature controlling means employed. This operation may be shaded, if desired, by so arranging the controls that the outdoor air supply through the damper 10, or its equivalent, will be progressively increased as the heating means are progressively restricted. In other words, so that they operate inversely in a progressive series rather than in a clearly defined sequential order.

Figure 3:
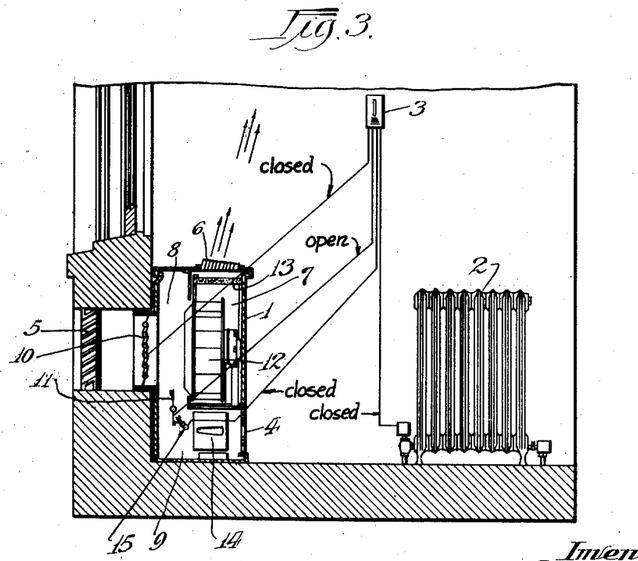

Fig. 3 represents the second, or middle, step in correcting either a rising or falling temperature. This may be called a neutral step, in the case illustrated, because both the heating and cooling functions are reduced to a minimum and the system is in a state of thermal balance. The radiators 2 and 14 are both "off" and the outdoor damper 10 is closed, while the recirculating damper 11 is open. The balance of the artificial heating means represented by the radiator 14 may be closed off either quickly or gradually, depending upon the temperature controlling means employed. The only function of the system illustrated, in this condition, is to maintain air motion in the room by recirculation. Where the adjustment or character of the apparatus used is such that the heating and cooling functions overlap, this stage is shaded out at a point where the two adverse functions are in thermal balance.

Figure 4:
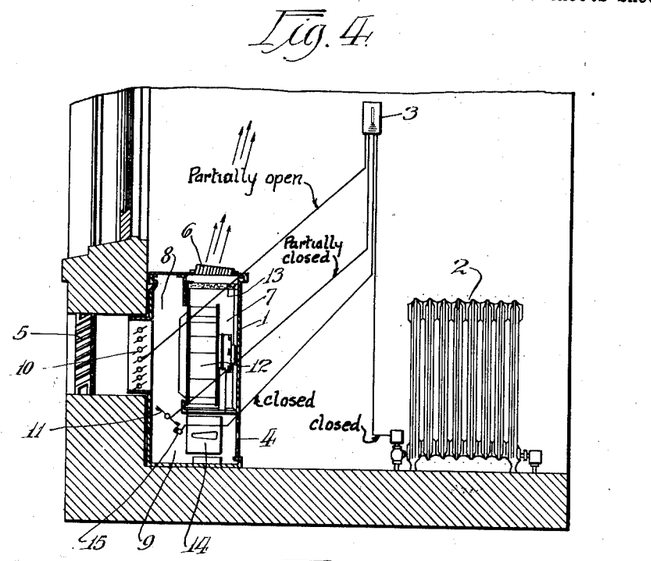

Fig. 4 represents the third step in correcting over-heating, or the first step in correcting a falling room temperature. In the case illustrated, all artificial heating means, represented by the radiators 2 and 14, are "off" or "closed" and the outdoor air damper 10 is partially open, while the recirculation damper 11 is partially closed. In this stage, the rate of air motion in the room is maintained by the recirculation of a mixture of indoor and outdoor air. The operation of the dampers 10 and 11, in this step, is preferably gradual. This operation may be shaded, if desired, by so correlating the controls that the artificial heating means, represented by the radiators 2 and 14, are not completely restricted until this stage has progressed.

Figure 5:
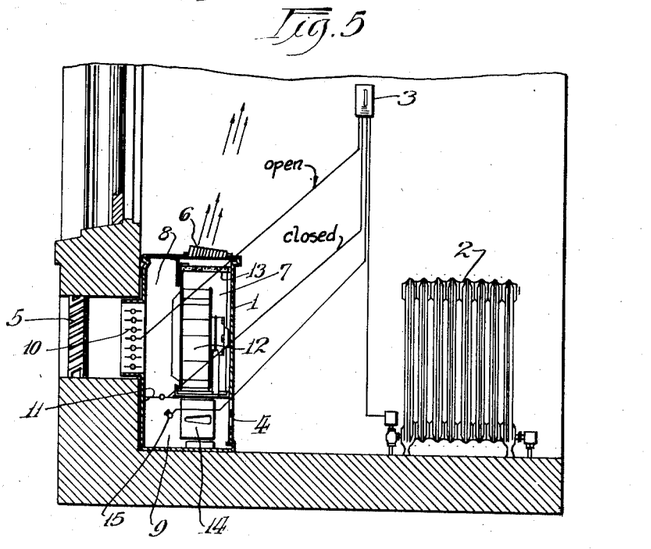

In Fig. 5, the outdoor air damper 10 is fully open and the full cooling capacity of the system is "on." In the case illustrated, all controllable heating means, represented by the radiators 2 and 14, are "off" or "closed" and the recirculation damper 11 is closed, so that the system is developing maximum cooling capacity and maintaining the rate of air motion in the room entirely through the circulation of outdoor air. This operation may be shaded, if desired, either by not completely restricting the artificial heating means at this point, or by dispensing with the recirculating damper 11, or both. The condition of the damper 11 tends to increase the amount of air delivered by the system as the damper 10 opens, which results in increased air motion in the room, a result which is sometimes desirable.

Furthermore, in cases where the dampers 10 and 11, or an equivalent arrangement, are retained, it may not always be desirable to operate the two dampers in the same inverse ratio, since in some cases, particularly in windy weather, it may be desirable to retard the rate of opening of the outdoor damper with respect to the rate of closing of the indoor damper, in order to prevent the ingress of an excessive amount of cold outdoor air during the earlier closing stages of the indoor damper. In fact, variations in the timing of these operations are contemplated, provided only that a general progression in the order of operations is maintained in accordance with the plan or principle of the present invention.

The humidifier 15 is controlled in parallel with the heating means represented by the radiators 2 and 14, with the result that moisture may be added to the air in the room whenever it is being artificially heated, and consequently expanded and not added at other times. This is another feature of this invention which provides a simple and inexpensive means of humidifying in such a manner as to prevent either excessive dryness or wetness of the room air. Other advantages will appear in the claims as hereinafter set forth.

Figure 6:
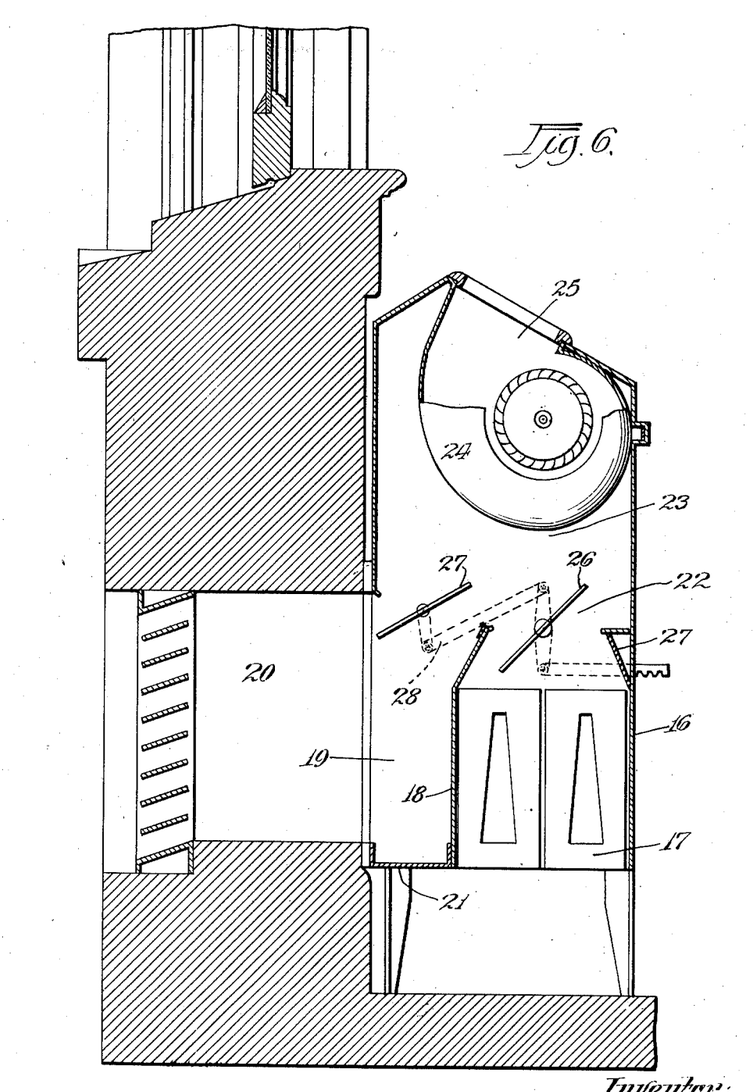
Fig. 6 shows a different form of heating and ventilating unit of the character shown and described in Otis Patent No. 1,753,156, and designed to illustrate an arrangement in which the several operations are performed in an overlapping sequence rather than in clearly segregated sequential order.

Fig. 6 illustrates a modified form of heating and ventilating unit adaptable, with suitable controls, to operate in conformity with the principles of the present invention. In this case, the heating and ventilating unit comprises a housing 16, similar in general structure to the one previously described, within which is located a radiator 17, which is separated by a partition 18 from the inlet chamber 19, to which exterior air is admitted through an opening 20.

The room air is admitted for recirculation through the base of the housing 21 and passes directly upward into contact with the radiator, and is discharged upwardly through an opening 22 into a mixing chamber 23, and thence into a fan 24, from which it is discharged into the room through an upwardly opening discharge port 25.

The upward flow of the heated room air is controlled by a damper 26, and the upward flow of the cool outdoor air is controlled by a damper 27, and the two dampers are actuated in inverse order by suitable linkage 28, which is adapted to be controlled either manually or by any suitable thermostatic means.

As shown, the linkage is of such nature as to operate the two dampers in unison and in inverse relation, although a slight readjustment of the linkage might be introduced to establish a sequential order in these operations, or, if desired, the parts might be so related, by mere adjustment of the linkage, that the hot air damper might be partially closed before the cool air damper begins to open, or the two operations might proceed concurrently with more rapid action imparted to the hot air damper than to the cold air damper.

Furthermore, if desired, the apparatus might be modified to include a co-ordinated control for the supply of heating medium (steam or water) to the radiator 17 with suitable connections to insure the preliminary cutting off of the supply of heating fluid in advance of a readjustment of the dampers. If such additional control were provided, the closing of the damper 26 might be deferred in order for a time to permit the recirculation of indoor air either exclusively or in admixture with outdoor air, and as an intermediate step in the progressive order of operations which terminate with the complete opening of the outdoor air damper with a complete closing of the recirculation damper.

Figure 7:
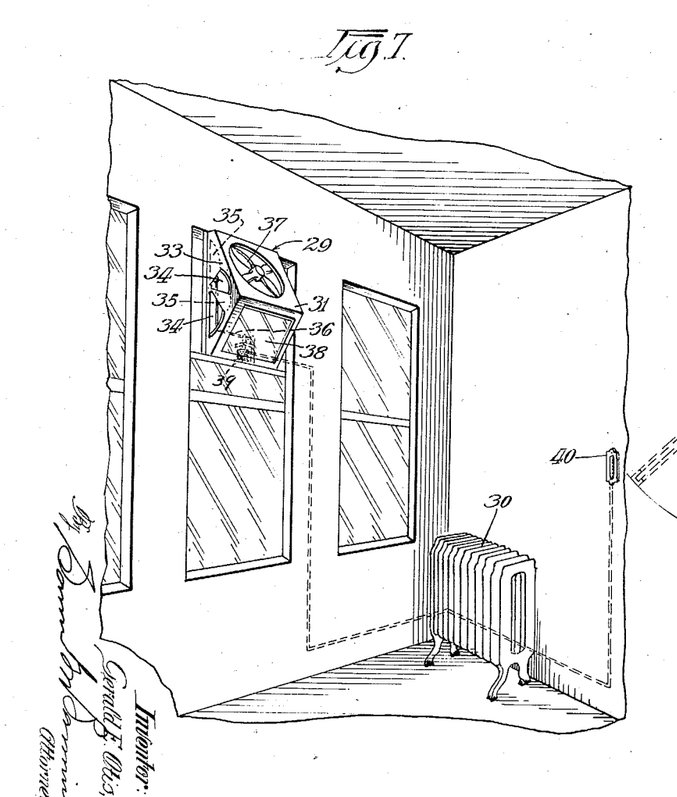
Fig. 7 is a diagram illustrating another form of apparatus, likewise adapted to carry out the steps of the present method, either in sequential order or in overlapping progression, depending upon the adjustment provided.

As a further exemplification of the principles of the present invention, reference is made to Fig. 7, which illustrates a ventilator 29 without heating appliances, adapted to be operated in correlation with a radiator 30. In this form of installation, the ventilator unit comprises a casing 31 having its outer body portion of square configuration to fit into the upper sash of a window, through which air is admitted from out of doors under the control of a cold air damper 32. The side walls 33 of the body portion are of triangular configuration and extend inwardly into the room. Each of the walls is provided with segmental recirculation ports 34 adapted to be controlled by a segmental damper 35.

As shown, the recirculation dampers and the cold air dampers are connected by suitable linkage 36 in such a way that as the recirculation dampers are closed, the cold air damper will be opened, though, as previously explained, the opening and closing operations need not occur in exactly inverse order, since a lag in one of these operations with respect to the other may in some cases be desirable and is contemplated as within the range of the present invention.

Figure 8:
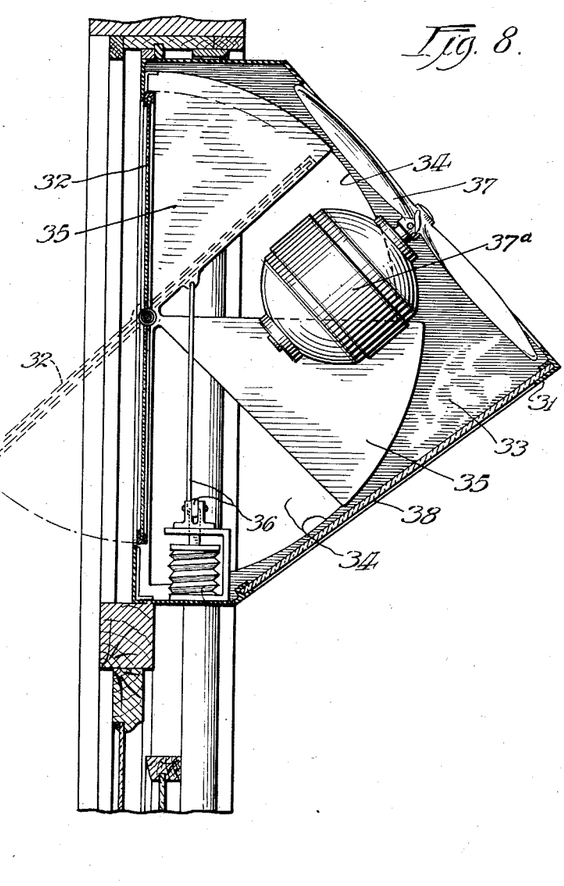
Fig. 8 is an interior view of the apparatus of Fig. 7.

The walls of the housing provide a support for an obliquely disposed fan 37 driven by a motor 37ª which directs the air currents obliquely upward toward the ceiling of the room. The lower side of the housing is closed by an obliquely disposed wall 38, which is preferably in the form of a glass panel, so that the illumination of the room will not be materially reduced.

As shown, a suitable motor 39 is provided for operating the inter-connected dampers in the proper sequential order, under the control of a thermostat 40, which is set to a suitable control temperature (for instance 70°), although, if desired, a thermostat may be employed which operates from one extreme to the other within a substantial range of temperatures, so that the dampers will fluctuate through intermediate adjustments conformable to the temperatures within the range covered by the thermostat.

Numerous other modifications in mechanism, or in the details for effecting control, either thermostatically or manually, may be introduced in the carrying out of the principles of the present invention.

It will be understood that in the claims I do not desire to be limited in respect to the character of the intermediate adjustments, and that where I refer to the increase of cooling as the heating is reduced, or vice versa, I do not desire to necessarily limit myself to a simultaneous inverse order of adjustments, but that I intend rather to cover any progressive series between the two extremes in which the heating and cooling adjustments occur in the progressive order indicated, and in conformity with the general scheme or principle of operation set forth in the present specification.

I claim:

1. In heating and ventilating a room the method of maintaining a uniform temperature of the air therein, which consists in constantly agitating it by forced circulation, in heating it by controllable artificial means, in cooling it through dilution with cooler outside air mechanically introduced and mixed with recirculated room air in amounts governed by its reaction on the temperature of the mixture, and in correlatively regulating said heating and cooling means to counteract room temperature variations within a selected range, so that within a portion of said range including its lower limit, the heating effect is reduced on a rising room temperature and increased on a falling room temperature and so that within a portion of said range including its upper limit, the amount of air introduced is increased on a rising room temperature and reduced on a falling room temperature.

2. The method of heating and ventilating a room under varying weather conditions, which consists in agitating the air within the room by forced circulation and heating it by controllable artificial means when heating is required, in providing for the admission into the room circulation of air recirculated from the room itself and of air derived from an outside source of fresh air, and when air from both sources is admitted of maintaining the circulation of said mixture in inversely varied proportions, the proportioning of said two volumes of air so mixed being dependent upon the reaction of the outside air on the temperature of the mixture, and in regulating the artificial heating means so that all controllable sources of heat are completely throttled on a rising room temperature within a selected range and released on a falling room temperature within said range.

3. The method of heating and ventilating a room under varying weather conditions, which consists in agitating the air within the room by forced circulation and heating and humidifying it by controllable artificial means when heating is required, in providing for the admission into the room circulation of air recirculated from the room itself and of air derived from an outside source of fresh air, and when air from both sources is admitted of maintaining the circulation of said mixture in inversely varied proportions, the proportioning of said two volumes of air so mixed being dependent upon the reaction of the outside air on the temperature of the mixture, and in regulating the artificial heating and humidifying means, so that the same are concurrently throttled on a rise of temperature within the selected range and concurrently released on a falling room temperature within said range.

GERALD E. OTIS.